(12) United States Patent
Cashman et al.

(10) Patent No.: US 8,639,466 B2
(45) Date of Patent: Jan. 28, 2014

(54) COMPUTERISED STORAGE SYSTEM COMPRISING ONE OR MORE REPLACEABLE UNITS FOR MANAGING TESTING OF ONE OR MORE REPLACEMENT UNITS

(75) Inventors: Paul N. Cashman, Winchester (GB); Timothy F. McCarthy, Winchester (GB); Roderick G. Moore, Winchester (GB); Jonathan I. Settle, Winchester (GB); Jonathan W. Short, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 13/058,000

(22) PCT Filed: Oct. 1, 2009

(86) PCT No.: PCT/EP2009/062757
§ 371 (c)(1), (2), (4) Date: Feb. 7, 2011

(87) PCT Pub. No.: WO2010/037814
PCT Pub. Date: Apr. 8, 2010

(65) Prior Publication Data
US 2011/0144939 A1 Jun. 16, 2011

(30) Foreign Application Priority Data
Oct. 2, 2008 (EP) ..................................... 08165694

(51) Int. Cl.
*G06F 19/00* (2011.01)
*G06F 11/28* (2006.01)

(52) U.S. Cl.
USPC .............................................. 702/120; 714/40

(58) Field of Classification Search
USPC ........................................................ 702/120
See application file for complete search history.

(56) References Cited

U.S. PATENT DOCUMENTS 5,293,556 A 3/1994 Hill et al.
7,155,636 B2 12/2006 Nagata
(Continued)

FOREIGN PATENT DOCUMENTS

| JP | 07-262100 | 10/1995 |
| JP | 2003288279 | 10/2003 |
| JP | 2008027240 | 2/2008 |
| WO | 2006100760 | 9/2006 |

OTHER PUBLICATIONS

U.S. Appl. No. 13/481,501, filed May 25, 2012, entitled "A Computerised Storage System Comprising Replaceable Uunits for Managing Testing of Replacement Units", by inventors P.N. Cashman, T.F. McCarthy, R.G. Moore, J.L. Settle and J.W. Short.

(Continued)

*Primary Examiner* — Bryan Bui
(74) *Attorney, Agent, or Firm* — David W. Victor; Konrad Raynes Davda & Victor LLP

(57) ABSTRACT

A method, apparatus and software is disclosed, for use in a computerised storage system comprising one or more replaceable units, for managing testing of one or more replacement units, where the storage system is automatically placed in a testing mode in response to a given unit being replaced and if testing fails the storage system automatically fails back to a service mode.

14 Claims, 5 Drawing Sheets

(56) References Cited

U.S. PATENT DOCUMENTS

| | | |
|---|---|---|
| 2004/0158424 A1 | 8/2004 | Mantey et al. |
| 2006/0117212 A1* | 6/2006 | Meyer et al. .................. 714/4 |
| 2008/0010484 A1 | 1/2008 | Ohta et al. |

OTHER PUBLICATIONS

Preliminary Amendment filed May 25, 2012 for U.S. Appl. No. 13/481,501, filed May 25, 2012, entitled "A Computerised Storage System Comprising Replaceable Uunits for Managing Testing of Replacement Units", by inventors P.N. Cashman, T.F. McCarthy, R.G. Moore, J.L. Settle and J.W. Short.

Statement of Amended Claims and Replacement Claims dated Apr. 19, 2010 for Application No. PCT/EP2009/062757, filed Oct. 1, 2009.

Written Opinion dated Feb. 4, 2011 for Application No. PCT/EP2009/062757, filed Oct. 1, 2009.

Published Amended Claims under Article 19 dated Jun. 3, 2010 for Application No. PCT/EP2009/062757, filed Oct. 1, 2009.

International Preliminary Report on Patentability Chapter 1, dated Apr. 5, 2011 for Application No. PCT/EP2009/062757, filed Oct. 1, 2009.

PCT International Search Report dated Feb. 22, 2010 for Application No. PCT/EP2009/062757 filed Oct. 1, 2009 for International Business Machines Corporation.

Information Materials for IDS regarding Japanese Office Action dated Feb. 5, 2013.

English machine translation for JP07262100 published Oct. 13, 1995.

English machine translation for JP2008027240 published Feb. 27, 2008.

JP Office Action dated Feb. 5, 2013 for JP Serial No. 2011-529553 filed Oct. 1, 2009.

* cited by examiner

COMPUTERISED STORAGE SYSTEM COMPRISING ONE OR MORE REPLACEABLE UNITS FOR MANAGING TESTING OF ONE OR MORE REPLACEMENT UNITS

FIELD OF INVENTION

The present invention relates to a method, apparatus or software for use in a computerised storage system, comprising one or more replaceable units, for managing testing of one or more replacement units.

BACKGROUND OF THE INVENTION

Computer systems are commonly built from an interconnected set of distinct components. When units become faulty they need to be replaced with a correctly functioning unit. Some computer systems, such as high availability storage systems, have built-in redundancy in which critical units are duplicated. Critical units may be units such as disk arrays, interface cards and connection cables, any of which may become faulty and require replacement. In such systems, the redundancy provided by duplicated units can be used to provide continuous service while a faulty unit is replaced. For example, if faults or errors are detected that suggest a connection cable needs to be replaced, user input/output (I/O) is diverted to a duplicate unit while the replacement is performed. Once the replacement unit is in place it is made available for use with user I/O. However, faults or errors may recur if they were misdiagnosed, a replacement unit is faulty or if more that one unit is contributing to the fault. In addition, if a replaced unit does not correct the detected faults or errors because user I/O may be disrupted.

SUMMARY OF THE INVENTION

The present invention accordingly provides, in a first aspect, a method for use in a computerised storage system, comprising one or more replaceable units, for managing testing of one or more replacement units, said method comprising the steps of: a) identifying a replaceable unit in a storage system for replacement and switching said storage system into a service mode; b) switching said storage system into a test mode automatically in response to the replacement of said replaceable unit with a replacement unit; c) testing said replacement unit in accordance with a predetermined testing policy so as to verify the functioning of said replacement unit; and d) returning said storage system to an online mode if said testing of said selected elements is successful.

Preferably, one or more further units from said storage system are selected for use in combination with said replacement unit for said testing. Preferably, said further units are selected for use in combination with said replacement unit so as to provide a suitable input/output (I/O) path for testing the full operational capacity of said replacement unit.

Preferably, said further units are automatically identified and selected for use in said testing.

Preferably, if no faults are detected in said testing then said storage system is automatically returned to said online mode. Preferably, if a predetermined level of faults are detected during said testing then said storage system is automatically returned to said service mode.

Preferably, said testing policy comprises sending exclusively test data to said replacement unit. Preferably, said testing policy comprises sending test data to said replacement unit, the level of said test data being arranged to complement the level of user data to said replacement unit so as to provide a predetermined level of I/O to said replacement unit.

Preferably, when said testing comprises writing data to one or more data storage units, said data is written to a reserved area of said storage unit. Preferably, said storage system comprises a plurality of duplicate storage systems for providing redundancy. Preferably, when said replacement unit in a given storage system is in test mode all user I/O is diverted to said duplicate storage system. Preferably, said storage system comprises one or more Fibre Channel Arbitrated Loops (FCALs).

In a second aspect, there is provided an apparatus for use in a computerised storage system, comprising one or more replaceable units, for managing testing of one or more replacement units, said apparatus being operable to: identify a replaceable unit in a storage system for replacement and switching said storage system into a service mode; switch said storage system into a test mode automatically in response to the replacement of said replaceable unit with a replacement unit; test said replacement unit in accordance with a predetermined testing policy so as to verify the functioning of said replacement unit; and return said storage system to an online mode if said testing of said selected elements is successful.

Preferably, one or more further units from said storage system are selected for use in combination with said replacement unit for said testing. Preferably, said further units are selected for use in combination with said replacement unit so as to provide a suitable input/output (I/O) path for testing the full operational capacity of said replacement unit. Preferably, said further units are automatically identified and selected for use in said testing.

Preferably, if no faults are detected in said testing then said storage system is automatically returned to said online mode. Preferably, if a predetermined level of faults are detected during said testing then said storage system is automatically returned to said service mode.

Preferably, said testing policy comprises sending exclusively test data to said replacement unit. Preferably, said testing policy comprises sending test data to said replacement unit, the level of said test data being arranged to complement the level of user data to said replacement unit so as to provide a predetermined level of I/O to said replacement unit. Preferably, when said testing comprises writing data to one or more data storage units, said data is written to a reserved area of said storage unit. Preferably, said storage system comprises a plurality of duplicate storage systems for providing redundancy. Preferably, when said replacement unit in a given storage system is in test mode all user I/O is diverted to said duplicate storage system. Preferably, said storage system comprises one or more Fibre Channel Arbitrated Loops (FCALs).

In a third aspect, there is provided a group of one or more programs arranged to enable a group of one or more programmable devices to perform the method or to provide the apparatus of the first or respectively the second aspect.

In a fourth aspect, there is provided a computer program comprising computer program code to, when loaded into a computer system and executed thereon, cause said computer system to perform all the steps of a method according to the first aspect.

The computer program may be provided in the form of a computer program product loadable into the internal memory of a digital computer, comprising software code portions for performing, when said product is run on a computer, the method of the first aspect.

An embodiment of the invention provides a method for use in a computerised storage system, comprising one or more replaceable units, for managing testing of one or more replacement units, the method comprising the steps of:

a) identifying a replaceable unit in a storage system for replacement and switching the storage system into a service mode;

b) switching the storage system into a test mode automatically in response to the replacement of the replaceable unit with a replacement unit;

c) testing the replacement unit in accordance with a predetermined testing policy so as to verify the functioning of the replacement unit; and d) returning the storage system to an online mode if the testing of the selected elements is successful.

One or more further units from the storage system may be selected for use in combination with the replacement unit for the testing. Further units may be selected for use in combination with the replacement unit so as to provide a suitable input/output (I/O) path for testing the full operational capacity of the replacement unit. The further units may be automatically identified and selected for use in the testing. If no faults are detected in the testing then the storage system may be automatically returned to the online mode. If a predetermined level of faults are detected during the testing then the storage system may be automatically returned to the service mode.

The testing policy may comprise sending exclusively test data to the replacement unit. The testing policy may comprise sending test data to the replacement unit, the level of the test data being arranged to complement the level of user data to the replacement unit so as to provide a predetermined level of I/O to the replacement unit. When the testing comprises writing data to one or more data storage units, the data may be written to a reserved area of the storage unit.

The storage system may comprise a plurality of duplicate storage systems for providing redundancy. When the replacement unit in a given storage system is in test mode all user I/O may be diverted to the duplicate storage system. The storage system may comprise one or more Fibre Channel Arbitrated Loops (FCALs).

Another embodiment provides apparatus for use in a computerised storage system, comprising one or more replaceable units, for managing testing of one or more replacement units, the apparatus being operable to:

identify a replaceable unit in a storage system for replacement and switching the storage system into a service mode;

switch the storage system into a test mode automatically in response to the replacement of the replaceable unit with a replacement unit;

test the replacement unit in accordance with a predetermined testing policy so as to verify the functioning of the replacement unit; and return the storage system to an online mode if the testing of the selected elements is successful.

A further embodiment provides a group of one or more programs arranged to enable a group of one or more programmable devices to perform a method for use in a computerised storage system, comprising one or more replaceable units, for managing testing of one or more replacement units, the method comprising the steps of:

a) identifying a replaceable unit in a storage system for replacement and switching the storage system into a service mode;

b) switching the storage system into a test mode automatically in response to the replacement of the replaceable unit with a replacement unit;

c) testing the replacement unit in accordance with a predetermined testing policy so as to verify the functioning of the replacement unit; and d) returning the storage system to an online mode if the testing of the selected elements is successful.

Another embodiment provides a group of one or more programs arranged to enable a group of one or more programmable devices to provide apparatus for use in a computerised storage system, comprising one or more replaceable units, for managing testing of one or more replacement units, the apparatus being operable to:

identify a replaceable unit in a storage system for replacement and switching the storage system into a service mode;

switch the storage system into a test mode automatically in response to the replacement of the replaceable unit with a replacement unit;

test the replacement unit in accordance with a predetermined testing policy so as to verify the functioning of the replacement unit; and return the storage system to an online mode if the testing of the selected elements is successful.

A further embodiment provides a computer program product loadable into the internal memory of a digital computer, comprising software code portions for performing, when the product is run on a computer, to carry out a method for use in a computerised storage system, comprising one or more replaceable units, for managing testing of one or more replacement units, the method comprising the steps of:

a) identifying a replaceable unit in a storage system for replacement and switching the storage system into a service mode;

b) switching the storage system into a test mode automatically in response to the replacement of the replaceable unit with a replacement unit;

c) testing the replacement unit in accordance with a predetermined testing policy so as to verify the functioning of the replacement unit; and d) returning the storage system to an online mode if the testing of the selected elements is successful.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
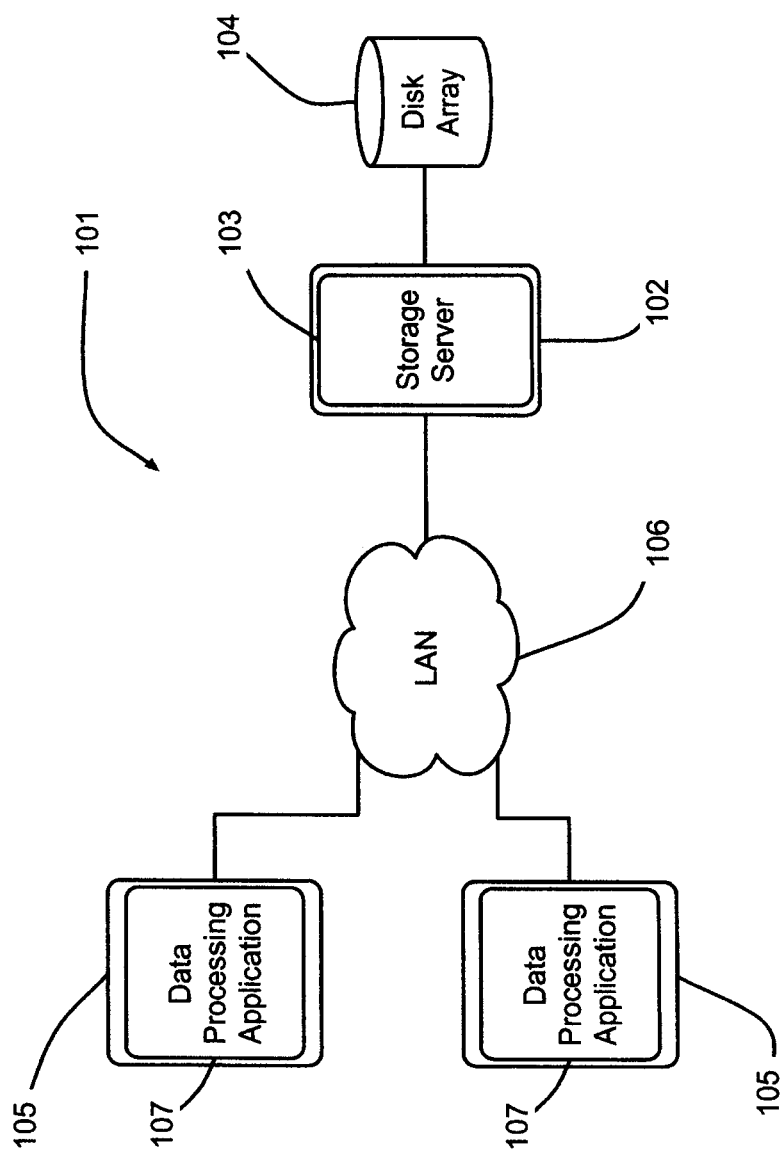
FIG. 1 is a schematic illustration of a computer network comprising a computerised storage system.

With reference to FIG. 1, a computer system comprises a first computer 102 loaded with a storage server application program 103 and connected to a storage system 104. The first computer 102 is connected to two second computers 105 via a network in the form of a local area network (LAN) 106. The second computers 105 are each loaded with a data processing application program 107 arranged to store and access data on the storage system 104 via the storage server 103. In other words, the data processing application programs 107 provide user input/output (I/O) to the storage server 103 and storage system 104.

Figure 2:
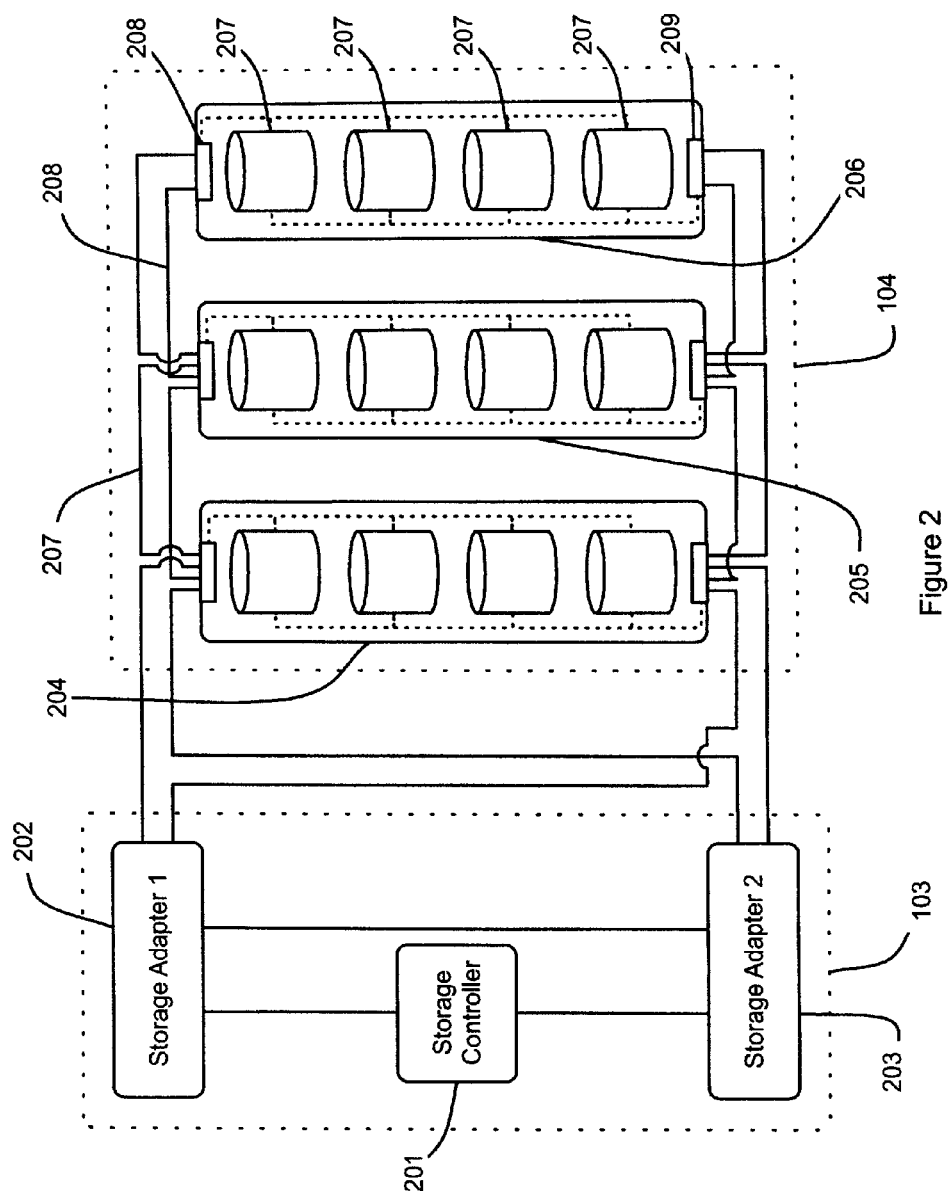
FIG. 2 is a schematic illustration showing the computerised storage system of FIG. 1 in further detail.

With reference to FIG. 2, the storage server application 103 comprises a storage controller 201, arranged to provide a user interface and to handle user I/O, and duplicated storage adapters 202, 203 arranged to cooperatively manage the provision, service and testing of the storage system 104 as described in further detail below. The storage system 104 comprises three disk arrays 204, 205, 206 each comprising four disks 207 and two interface cards 208, 209. Each interface card 208, 209 provides a connection port for connecting to the adapters 202, 203. A set of links 210, 211 are provided for connecting each of the adaptors 202, 203 to both interface cards 208, 209 of each disk array 204, 205, 206 in series. In FIG. 2, labels for each occurrence of some duplicated items, such as the links 210, 211, are omitted for clarity. The provision of multiple duplicate adaptors 202, 203, links 210, 211, disks 207 and interface cards 208, 209 provides the storage system 104 with multiple redundancy. In the present embodiment, each unit 207, 208, 209, 210, 211 is duplicated at least once so as to provide the redundancy by, in effect, providing two duplicate storage systems. The storage controller 201 is arranged to use the duplicate storage systems to provide high availability since, if one duplicate storage system is offline, its duplicate storage system is arranged to provide the required service.

In the present embodiment, each of the multiple links 210, 211, disks 207 and interface cards 208, 209 are provided as distinct units that may be replaced individually, commonly referred to as Field Replaceable Units (FRUs). The storage controller 201 comprises functionality to detect a range of faults and errors in the links 210, 211, disks 207 and interface cards 208, 209 and once detected an engineer is alerted. In order to replace a faulty FRU the relevant duplicate storage system is put from an online mode into a service mode with availability being maintained by the redundant duplicate storage system. In the present embodiment, when a given duplicate storage system is in service mode, all user I/O is diverted to the redundant duplicate storage system. The online or service mode switching is performed cooperatively between the respective storage adaptors 202, 203 so as to ensure that both are not simultaneously in service mode and thus availability is maintained.

In the present embodiment, the storage adaptors 202, 203 are arranged with a further mode, in the form of a testing mode, which is an intermediate mode between the service mode and the online mode. When an engineer has replaced an FRU and indicates that the duplicate storage system can return to online mode, the relevant storage adaptor 202, 203 is arranged to automatically place the duplicate storage system into testing mode. In testing mode, a set of one or more predetermined tests are run on the replacement FRU to ensure that it is functioning correctly and that the replacement has fixed the detected fault. In the present embodiment, the tests are selected in dependence on the type of the FRU that has been replaced. In the present embodiment, in test mode user I/O is permitted on the given duplicate storage system. However, the testing mode switching is performed cooperatively between the respective storage adaptors 202, 203 so as to ensure that both are not simultaneously in testing mode. This is arranged to avoid the possibility of both systems failing back to service mode simultaneously.

Figure 3A:
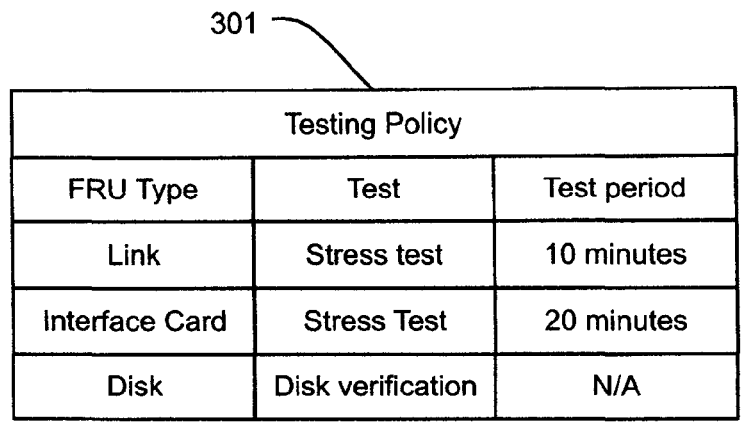
FIG. 3a is a table illustrating connection of units within the computerised storage system of FIG. 2.

With reference to FIG. 3*a*, the tests are defined in a testing policy 301 that identifies an appropriate test for each type of FRU in the storage system 104 and, if applicable, a time duration for the test. For example, if the replaced FRU is a link, the replacement link is stress tested for ten minutes. If the FRU is a disk, a disk verification test is performed which runs for an indeterminate time until completed or aborted. While a given duplicate storage system is in testing mode it is monitored for any new or recurring faults. If any faults are detected then the duplicate storage system is automatically reverted to service mode. If, however, testing is completed and no faults are detected then the duplicate storage system is automatically returned to online mode.

As noted above, with reference to FIG. 3*a*, a stress test performed on replacement links. The stress test is arranged to test the maximum data rate for a replaced link by feeding an appropriate level of test I/O through the link and monitoring its performance for the test period. However, if a link has a greater capacity than its immediately downstream element, such as a disk, then a number of downstream elements may need to be selected to provide the appropriate bandwidth to perform the stress test. For example, if a replaced link has a maximum data rate of 2 gigabits/second (Gb/s) and is connected upstream of disks each with a 50 megabytes/second (MB/s) maximum data rate then four disks will need to be used to absorb the test data in the form of 2 Gb/s of test I/O.

Figure 3B:
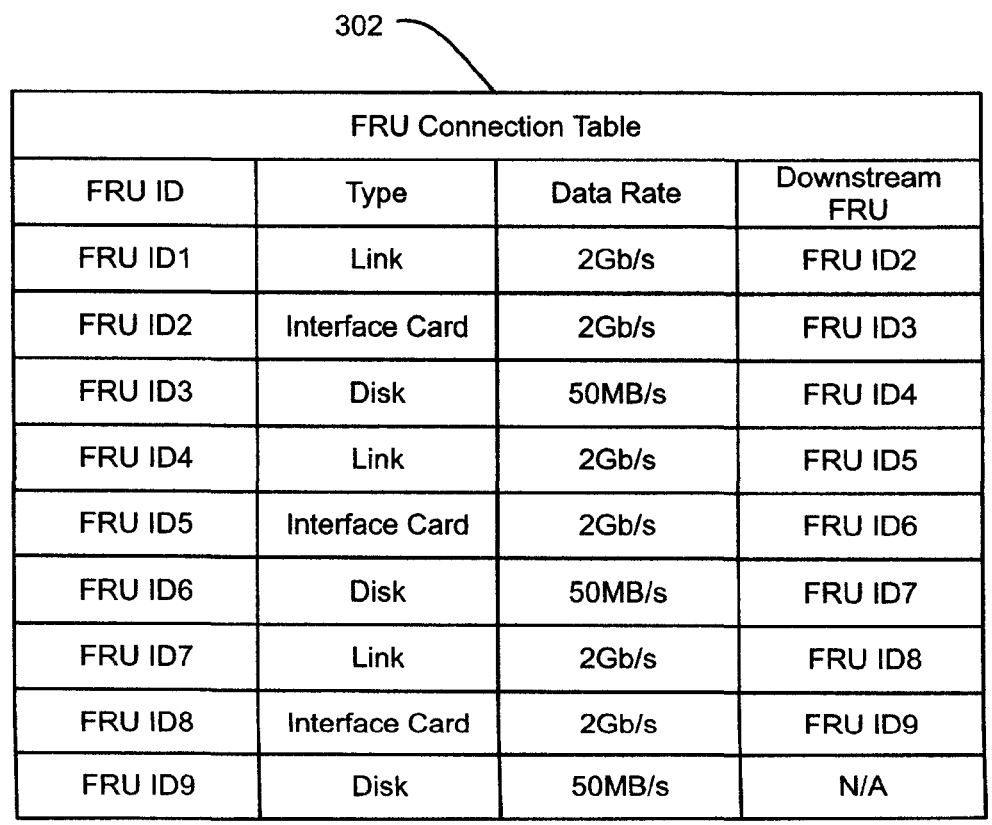
FIG. 3b is a table illustrating testing policies for the computerised storage system of FIG. 2.

With reference to FIG. 3*b*, each storage adaptor 202, 203 is arranged to maintain table 302, in the form of an FRU connection table, which records a unique identifier (FRU ID) for each FRU in the storage system 104 along with the type of the given FRU and the FRU ID of the immediately downstream unit. The storage adaptors 202, 203 are arranged to use the FRU connection table 302 to identify units downstream from a replacement unit that provide suitable targets for test I/O so as to enable the provision of a suitable level of test I/O for the replacement unit.

Figure 4:
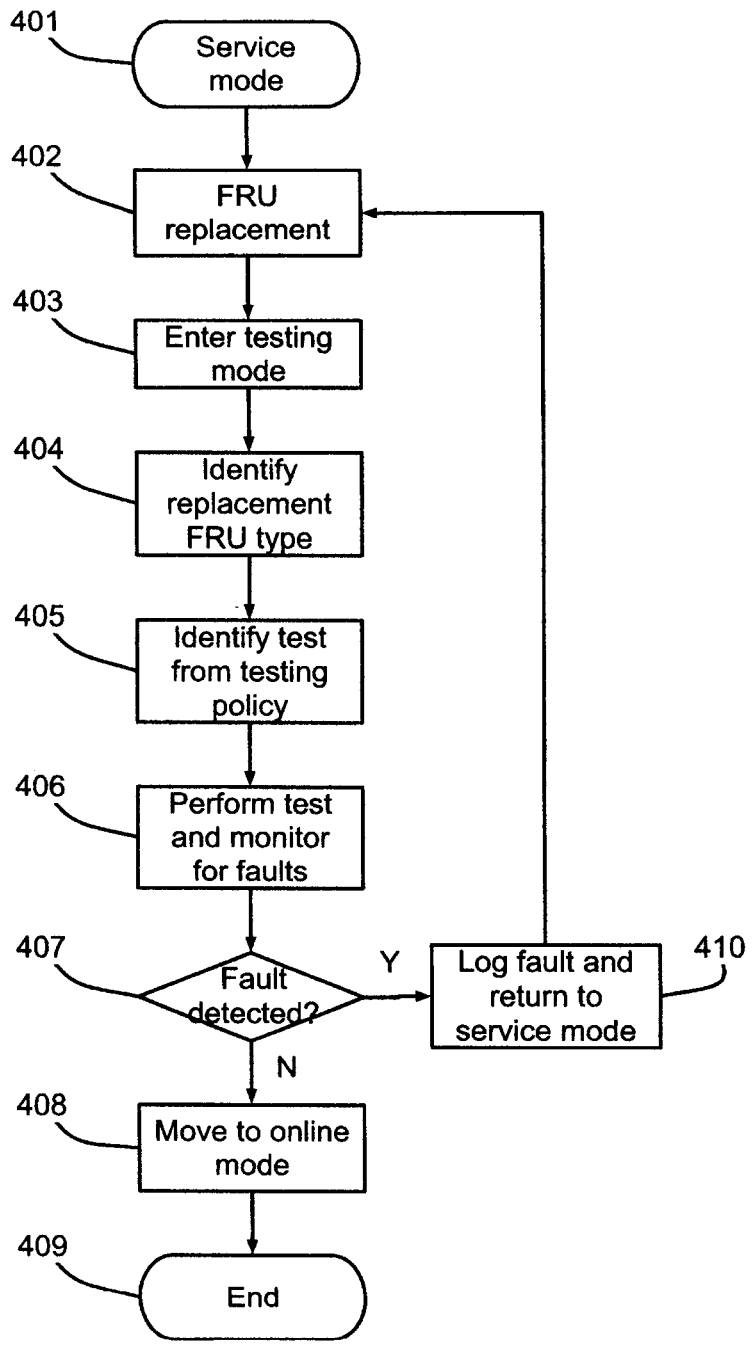
FIG. 4 is a flow chart illustrating processing performed by the computerised storage system of FIG. 2.

The processing performed by the storage adaptors 202, 203 in response to being placed in service mode as a result of detecting a fault on their respective duplicate storage system will now be described further with reference to the flow chart of FIG. 4. At step 401, processing is initiated in response to a duplicate storage system being placed into service mode and processing moves to step 402 to await replacement of the faulty FRU. When the faulty FRU has been replaced, as indicated by the installing engineer, processing moves to step 403 where the duplicate storage system automatically enters testing mode and processing moves to step 404. At step 404, the type of the replacement FRU is identified and processing moves to step 405. At step 405, the appropriate test is identified from the testing policy 301 using the identified FRU type and processing moves to step 406. At step 406, the identified test is performed and processing moves to step 407. At step 407, fault monitoring is performed and if no faults are detected for the duration of the test processing moves to step 408. At step 408, the duplicate storage system is placed automatically into online mode and processing ends at step 409. If at step 407 a predetermined set of one or more faults is detected then processing moves to step 410. At step 410, the or each fault is logged and the duplicate storage system is automatically returned to service mode. Processing then moves to step 402 to await further service action and then proceeds as described above.

Figure 5:
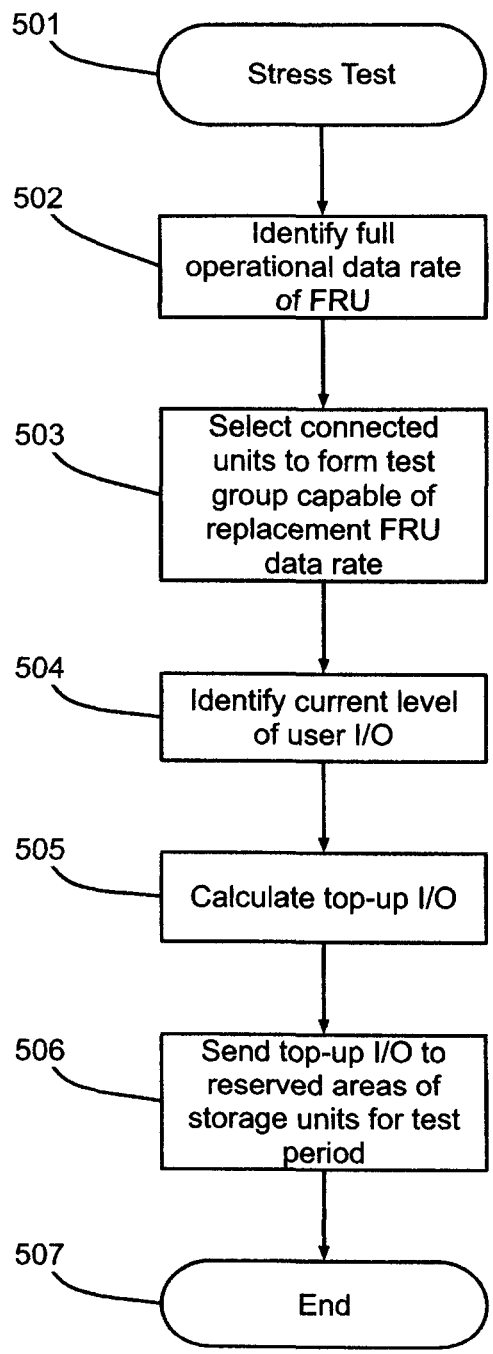
FIG. 5 is a flow chart illustrating further processing performed by the computerised storage system of FIG. 2.

The processing performed by the storage adaptors 202, 203 in response to initiating a stress test will now be described further with reference to the flow chart of FIG. 5. At step 501, processing is initiated in response to the identification of a stress test at step 405 in the flow chart of FIG. 4 and processing moves to step 502. At step 502 the maximum operational data rate for the replacement FRU is identified from the FRU connection table 302 and processing moves to step 503. At step 503, again using the FRU connection table 302, a set of connected units from the duplicate storage system are selected to form a test group capable of handling or absorbing I/O at the maximum operational data rate of the replacement FRU. Processing then moves to step 504 where the current level of user I/O is determined. As noted above, in the present embodiment, user I/O is permitted on a duplicate storage system in testing mode. Once the level of user I/O is determined processing moves to step 505. At step 505, the required amount of top-up test I/O is calculated, that is, the test I/O required to top-up the measured user I/O to the maximum operational data rate for the replacement FRU, and processing moves to step 506. At step 506, the top-up test I/O is generated and routed to the test group of units selected in step 503 for the defined period for the stress test. Once the test I/O has been provided for the defined period processing moves to step 507 and ends.

In the present embodiment, the top-up test I/O is sent to an area of a relevant disk drive that is reserved for that purpose. In other words, user I/O is specifically excluded from the reserved area of the test I/O target disk drive so as to avoid any user I/O being overwritten or corrupted with test I/O.

When a duplicate storage system is placed into testing mode, at least a part of the user I/O is arranged to fail back from using the redundant duplicate storage system to the duplicate storage system under investigation. If any errors are identified, such as unexpected reconfiguration of the loop or dropped frames, this leads to the immediate failure of testing mode and a fail back to service mode, which in turn re-drives the user I/O only down the redundant duplicate storage system. This results in no risk to customer access since the redundant storage system remains a good path for data. If a testing mode fails, the replacement FRU can be reinvestigated and further repair actions carried out. This improves confidence in a given repair, for example, when the problem being fixed was intermittent and could not easily be identified as a single FRU failure.

In another embodiment, no redundancy is provided in the system and while the system is in service mode, no user I/O can be handled. In another embodiment, partial redundancy is provided, that is, redundancy is provided for some but not all units in the system. In another embodiment, each FRU itself is arranged to have individual service, testing and online modes rather than global modes for the system as a whole. In a further embodiment, no user I/O is used on a given system during in testing mode and if stress testing is performed, the test data is arranged to provide the maximum operational data rate for the replacement FRU.

As will be understood by those in the art, a replacement unit may not be a direct replacement for an existing or faulty unit but may be an upgraded unit or a newly installed unit being added to the system, for example, to fix a fault or to provide additional functionality. Furthermore, more than one FRU may be replaced during a given service action which may result in more that one FRU being tested in a given test. As will be understood by those skilled in the art, the format of the test I/O may be arranged specifically for the type of transport equipment under test. For example, Fibre Channel Arbitrated Loop (FCAL) systems may be best stressed with a pattern of I/O comprising a stream of bits, which change value with low frequency.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs.

Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, additional advantages and modifications will readily appear to those skilled in the art.

The invention claimed is:

1. A system comprising:
   at least one replaceable unit;
   at least one adaptor executing a program to perform operations, the operations comprising:
      identifying a replaceable unit in the system for replacement;
      switching the system into a service mode;
      switching the system into a test mode in response to the replacement of the replaceable unit with a replacement unit;
      determining at least one connected unit connected downstream to the replaceable unit from information associating the replaceable unit with at least one connected unit, wherein the information indicates downstream relationships among the at least one connected units and the replaceable unit;
      testing the replacement unit in combination with the determined at least one connected unit downstream from the replaceable unit forming an Input/Output (I/O) path for testing I/O in accordance with a predetermined testing policy so as to verify the functioning of the replacement unit by sending test data to the replacement unit and the determined at least one connected unit; and
      returning the system to an online mode if the testing of the selected elements is successful.

2. The system of claim 1, wherein the testing of the replacement unit comprises testing a maximum operational capacity of the replacement unit.

3. The system of claim 1, wherein the test is successful if no faults are detected during the testing; and
   returning the system to the service mode in response to detecting a predetermined level of faults during the testing.

4. The system of claim 1, wherein the testing further comprises writing data to a reserved area of a storage unit that does not include user data.

5. The system of claim 1, wherein the at least one adaptor includes a first and second adaptors, wherein in the service mode, the first adaptor is in the service mode and the second adaptor is in the online mode to maintain availability, and wherein in the testing mode, the first adaptor tests the replacement unit.

6. The system of claim 5, wherein the first and second adaptors maintain a first table and second table, respectively, indicating tests for different types of replaceable units, wherein the operations further comprise:
   selecting, by the first adaptor, the test indicated in the first table for a type of the replacement unit, wherein the selected test is used to test the replacement unit.

7. The system of claim 6, wherein the operations further comprise:
   determining, by the first adaptor, from the first table at least one additional connected unit connected to the replacement unit in the system, wherein the test is performed with respect to the replacement unit and the at least one connected unit.

8. A storage device system including a program for testing replaceable units in a system, wherein the program is executed to perform operations, the operations comprising:
    identifying a replaceable unit in the system for replacement;
    switching the system into a service mode;
    switching the system into a test mode in response to the replacement of the replaceable unit with a replacement unit;
    determining at least one connected unit connected downstream to the replaceable unit from information associating the replaceable unit with at least one connected unit, wherein the information indicates downstream relationships among the at least one connected units and the replaceable unit;
    testing the replacement unit in combination with the determined at least one connected unit downstream from the replaceable unit forming an Input/Output (I/O) path for testing I/O in accordance with a predetermined testing policy so as to verify the functioning of the replacement unit by sending test data to the replacement unit and the determined at least one connected unit; and
    returning the system to an online mode if the testing of the selected elements is successful.

9. The storage device of claim 8, wherein the testing of the replacement unit comprises testing a maximum operational capacity of the replacement unit.

10. The storage device of claim 8, wherein the test is successful if no faults are detected during the testing, and wherein the operations further comprise:
    returning the system to the service mode in response to detecting a predetermined level of faults during the testing.

11. The storage device of claim 8, wherein the testing further comprises writing data to a reserved area of a storage unit that does not include user data.

12. The storage device of claim 8, wherein the operations are performed with respect to a first and second adaptors, wherein in the service mode, the first adaptor is in the service mode and the second adaptor is in the online mode to maintain availability, and wherein in the testing mode, the first adaptor tests the replacement unit.

13. The storage device of claim 12, wherein the first and second adaptors maintain a first table and second table, respectively, indicating tests for different types of replaceable units, wherein the operations further comprise:
    selecting, by the first adaptor, the test indicated in the first table for a type of the replacement unit, wherein the selected test is used to test the replacement unit.

14. The storage device of claim 13, wherein the operations further comprise:
    determining, by the first adaptor, from the first table at least one additional connected unit connected to the replacement unit in the system, wherein the test is performed with respect to the replacement unit and the at least one connected unit.

* * * * *